(12) United States Patent
Gaillard-Groleas et al.

(10) Patent No.: US 8,899,600 B2
(45) Date of Patent: Dec. 2, 2014

(54) DEVICE FOR CONTROLLING THE ANGLE OF TILT OF A FRAME MOUNTED ON A TILTABLE WHEEL SET

(75) Inventors: Jerome Gaillard-Groleas, Aix-en-Provence (FR); Gilles Schaeffer, Le Kremlin Bicetre (FR)

(73) Assignee: Veleance, Meyreuil (FR)

( * ) Notice: Subject to any disclaimer, the term of this patent is extended or adjusted under 35 U.S.C. 154(b) by 0 days.

(21) Appl. No.: 13/806,316

(22) PCT Filed: Jun. 22, 2011

(86) PCT No.: PCT/FR2011/000355
§ 371 (c)(1),
(2), (4) Date: Mar. 8, 2013

(87) PCT Pub. No.: WO2011/161334
PCT Pub. Date: Dec. 29, 2011

(65) Prior Publication Data
US 2013/0161919 A1 Jun. 27, 2013

(30) Foreign Application Priority Data
Jun. 23, 2010 (FR) .................................... 10 02630

(51) Int. Cl.
| | | |
|---|---|---|
| B62D 9/02 | (2006.01) | |
| B60G 17/005 | (2006.01) | |
| B60G 21/073 | (2006.01) | |
| B60G 99/00 | (2010.01) | |
| B60G 21/00 | (2006.01) | |
| B62K 5/01 | (2013.01) | |
| B62K 5/10 | (2013.01) | |
| B60G 3/08 | (2006.01) | |

(52) U.S. Cl.
CPC .............. *B60G 99/00* (2013.01); *B60G 21/007* (2013.01); *B62K 5/01* (2013.01); *B62K 5/10* (2013.01); *B60G 3/08* (2013.01); *B60G 2204/421* (2013.01); *B60G 2300/45* (2013.01)
USPC .......... 280/124.103; 280/124.128; 280/5.509; 280/755; 280/6.16

(58) Field of Classification Search
CPC ...... B60G 17/005; B60G 21/007; B60K 5/10; B62D 9/02
USPC ........ 280/124.128, 124.103, 5.509, 6.16, 755
See application file for complete search history.

(56) References Cited

U.S. PATENT DOCUMENTS

| | | | |
|---|---|---|---|
| 4,484,648 A | 11/1984 | Jephcott | |
| 5,765,846 A * | 6/1998 | Braun | .................... 280/124.103 |

(Continued)

FOREIGN PATENT DOCUMENTS

| | | |
|---|---|---|
| FR | 2 550 507 A1 | 2/1985 |
| FR | 2 616 405 A1 | 12/1988 |

(Continued)

*Primary Examiner* — Ruth Ilan
(74) *Attorney, Agent, or Firm* — Sughrue Mion, PLLC

(57) ABSTRACT

The present invention relates to a device mounted on a wheel set that comprises:
  a rocker beam 14 connected firstly to a tiltable frame 10 by means of a shock absorber 17 and secondly to two oscillating arms 7, 8 via two connecting rods 13, 15; and
  blocking means 27 having a first anchor point on said rocker beam 14.
Furthermore, the device comprises decoupling means constituted by a horizontal lever 21 and a vertical lever 22 that are connected together by a connection point 24 about which they are capable of pivoting, the free ends of said levers being connected respectively to said frame and to said rocker beam, the second anchor point of said blocking means 27 being on said decoupling means.
The invention also provides a vehicle, in particular a quadricycle, provided with the device.

12 Claims, 4 Drawing Sheets

(56) References Cited

U.S. PATENT DOCUMENTS 7,530,419 B2 * 5/2009 Brudeli .................. 180/210
2008/0197597 A1 * 8/2008 Moulene et al. ....... 280/124.103

FOREIGN PATENT DOCUMENTS

FR 2 646 379 A1 11/1990
FR 2 933 950 A1 1/2010

* cited by examiner

DEVICE FOR CONTROLLING THE ANGLE OF TILT OF A FRAME MOUNTED ON A TILTABLE WHEEL SET

CROSS REFERENCE TO RELATED APPLICATIONS

This application is a National Stage of International Application No. PCT/FR2011/000355 filed Jun. 22, 2011, claiming priority based on French Patent Application No. 1002630 filed Jun. 23, 2010, the contents of all of which are incorporated herein by reference in their entirety.

BACKGROUND OF THE INVENTION

The present invention relates to a device for controlling the angle of tilt of a frame mounted on a tiltable wheel set.

The field of the invention is thus that of vehicles that include a tiltable frame such as tricycles or quadricycles. With a tricycle, the frame supports one wheel at one of its ends and it is hinged to a wheel set at its other end. With a quadricycle, the frame is hinged between a front wheel set and a rear wheel set. Each wheel set thus comprises two wheels and the present invention relates to sets in which the two wheels are independent and are also tiltable.

Thus, document FR 2 616 405 teaches a motor-driven tricycle having a rear wheel set in which the wheels are independent and tiltable. Each of those wheels is mounted on an oscillating arm also hinged to a transverse shaft secured to the frame. A rocker arm has its center connected to the frame by a shock absorber and has its two ends connected to the two oscillating arms by connecting rods.

It is found that that tricycle does not provide the required level of safety at high speed when negotiating bends. The frame is subjected to centrifugal force that is due essentially to the weight of the rider tending to tilt towards the outside of the turn.

Such a position of the frame makes driving difficult or even dangerous. Furthermore, the rider may nevertheless be caused to make the frame tilt in the wrong direction.

Document WO 2006/130007 describes a tricycle with its tilt angle being motor-driven. The control of this motor drive takes account of a speed sensor, a direction sensor, and a lateral acceleration sensor. It is designed to give precedence to lateral acceleration when stationary or at low speed, whereas at high speed it is the direction sensor that predominates. Once again, the tilt angle of the frame is not really under control at high speed.

Motor drive for the tilt angle interferes with natural riding since it imposes the tilt angle rather than allowing physical phenomena to act, namely weight and centrifugal force. Furthermore, it consumes energy in order to set the tilt angle of the frame, and that is very penalizing in ecological vehicles with low fuel consumption and therefore appears to be practically inapplicable for a human-propelled non-motorized vehicle.

Furthermore, the complete system for controlling tilt angle is rather complex, which is clearly a handicap in terms of vehicle cost.

Thus, document FR 2 825 672 provides a solution for limiting the risk of tilting in the wrong direction. The tricycle has an axle arranged at the rear, a frame that supports the steering wheel at the front, and a hinge for connecting the frame to the axle. However in that document the hinge is passive, with the frame being free to tilt in compliance with the resultant of the forces that are applied thereto. That tricycle also has means for blocking the hinge, which means are controlled by a pendulum member. The objective in that document is to avoid the frame tilting when stationary or at very low speed, and the mechanism is thus deactivated as soon as the speed exceeds a predetermined threshold. The pendulum member presents mechanical structure that is complex and can lead to the frame being jammed suddenly.

Also known is document FR 2 933 950 that provides a satisfactory solution in terms of controlling tilt angle. In that document, a device comprises a chassis, a tiltable frame, a passive hinge enabling the frame to tilt relative to the chassis, and blocking means for blocking the hinge, namely an actuator. Control is performed by means of an accelerometer arranged on the tiltable frame and a control circuit that blocks the actuator when acceleration becomes too great.

Adapting teaching of that document to a wheel set having oscillating arms leads to arranging the blocking means between the frame and the rocker beam, as in document FR 2 550 507. That arrangement does not favor decoupling between the shock absorber and the actuator.

When tilting, it is appropriate to avoid interfering with the free movement of the shock absorber in order to avoid any interference with tilting. Unfortunately, the length of the actuator is a function of the tilt angle: this variation in length opposes free movement of the shock absorber.

When hunting, it is also desirable for there to be no variation in the length of the actuator in order to avoid opposing the shock absorber. Once more the length of the actuator is a function of the length of the shock absorber.

SUMMARY OF THE INVENTION

The object of the present invention is to provide a device for controlling the tilt angle of a frame mounted on a tiltable wheel set that gives satisfaction concerning decoupling between the shock absorber and the blocking means.

According to the invention, the device is mounted on a wheel set that comprises:
a rocker beam connected firstly to a tiltable frame by means of a shock absorber and secondly to two oscillating arms via two connecting rods; and
blocking means having a first anchor point on said rocker beam;
furthermore, the device comprises decoupling means constituted by a horizontal lever and a vertical lever that are connected together by a connection point about which they are capable of pivoting, the free ends of said levers being connected respectively to said frame and to said rocker beam, the second anchor point of said blocking means being on said decoupling means.

The second anchor point is thus offset outside the frame to minimize variations in the length of the blocking means. This consequentially minimizes coupling between the shock absorber and the blocking means.

Advantageously, the second anchor point coincides with said connection point.

Preferably, said shock absorber has its first end connected to said frame and its second end connected to said rocker beam, and said horizontal lever is connected to said frame at said first end.

Advantageously, said first anchor point is positioned at said second end of said shock absorber.

In a preferred embodiment, said blocking means comprise a double-acting actuator.

For example, the two chambers of said double-acting actuator are connected together by two opposite-direction one-way pipes each including a respective valve.

Furthermore, each of said one-way pipes includes a check valve.

Advantageously, the device is arranged, when said transverse acceleration exceeds a predetermined threshold, to close that one of said valves that allows said actuator to move in the direction of said acceleration.

Furthermore, the device is arranged to determine the through section of said valve as a function of the modulus of said transverse acceleration.

Thus, when the longitudinal speed of the device is also available, the device is arranged to determine the flow section of said valve as a function of the modulus of said longitudinal speed.

The invention also applies a vehicle, in particular a quadricycle, fitted with the above-described device.

BRIEF DESCRIPTION OF THE DRAWINGS

The present invention appears below in greater detail from the following description of embodiments given by way of illustration and with reference to the accompanying drawings, in which.

Elements present in more than one of the figures are given the same references in each of them.

SUMMARY OF THE INVENTION

Figure 1:
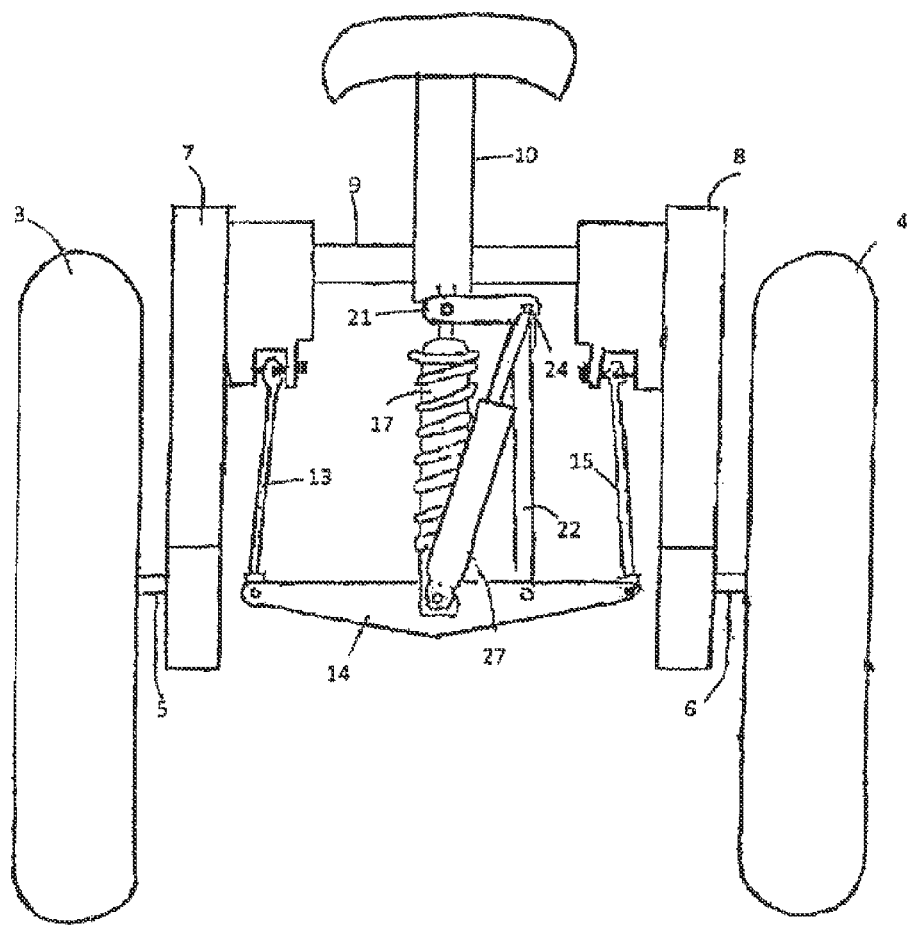
FIG. 1 is a diagrammatic rear view of a wheel set having two independent wheels mounted on a tiltable frame shown in the vertical position.

With reference to FIG. 1, the invention is shown on the rear wheel set of a tricycle or a quadricycle having wheels that are independent.

This wheel set thus comprises a left wheel 3 and a right wheel 4 mounted on respective left and right transverse shafts 5 and 6, themselves fastened to the bottom ends of respective left and right oscillating arms 7 and 8. These side arms, also known as "trailing" arms, are secured at their top ends to a longitudinal shaft 9 that passes through the tiltable frame 10.

A left connecting rod 13 has its top end hinged to the top portion of the left arm 7 and its bottom end hinged to the left end of a rocker beam 14 that is described in greater detail below.

Likewise, a right connecting rod 15 is hinged between the top end of the right arm 8 and the right end of the rocker beam 14.

The rocker beam 14 is a rigid element arranged transversely between the wheels 3 and 4 of the vehicle 10. It is floatingly mounted relative to the frame 10, i.e. it can rock relative thereto. When the frame and the wheels are tilted, the rocker beam remains horizontal, substantially parallel to the road.

The rocker beam 14 is also connected to the frame 10 substantially in its center. This connection may be rigid. Nevertheless, the connection is preferably via a shock absorber 17 that is fastened between the frame 10 and the rocker beam 14.

In the invention, decoupling means are provided to support the blocking means.

The decoupling means comprise a horizontal lever 21 and a vertical lever 22 that are connected together via a connection point 24 about which they are capable of pivoting.

The free end of the horizontal lever 21 is fastened to the frame 10, advantageously at the top end of the shock absorber 17. The free end of the vertical lever 22 is fastened to the rocker beam 14 between its center and one of its ends (right end in the figure).

This defines a deformable parallelogram having two long sides constituted by the shock absorber 17 and the vertical lever 22, and two short sides constituted by the horizontal lever 21 and the facing section of the rocker beam 14.

The function of the decoupler means is to offset an anchor point for the blocking means to outside the frame.

The function of the blocking means is to stiffen the structure of the decoupling means in order to hold the frame at a given angle of tilt.

The blocking means comprise an element of length that can vary but that can be blocked in a determined position. In this example, the blocking means comprise a double-acting actuator having its ends fastened to a first anchor point on the rocker beam and a second anchor point on the decoupling means.

In a preferred embodiment, the second anchor point coincides with the connection point 24 between the two levers 21 and 22, and the second anchor point coincides with the fastener point at the bottom end of the shock absorber 17.

Figure 2:
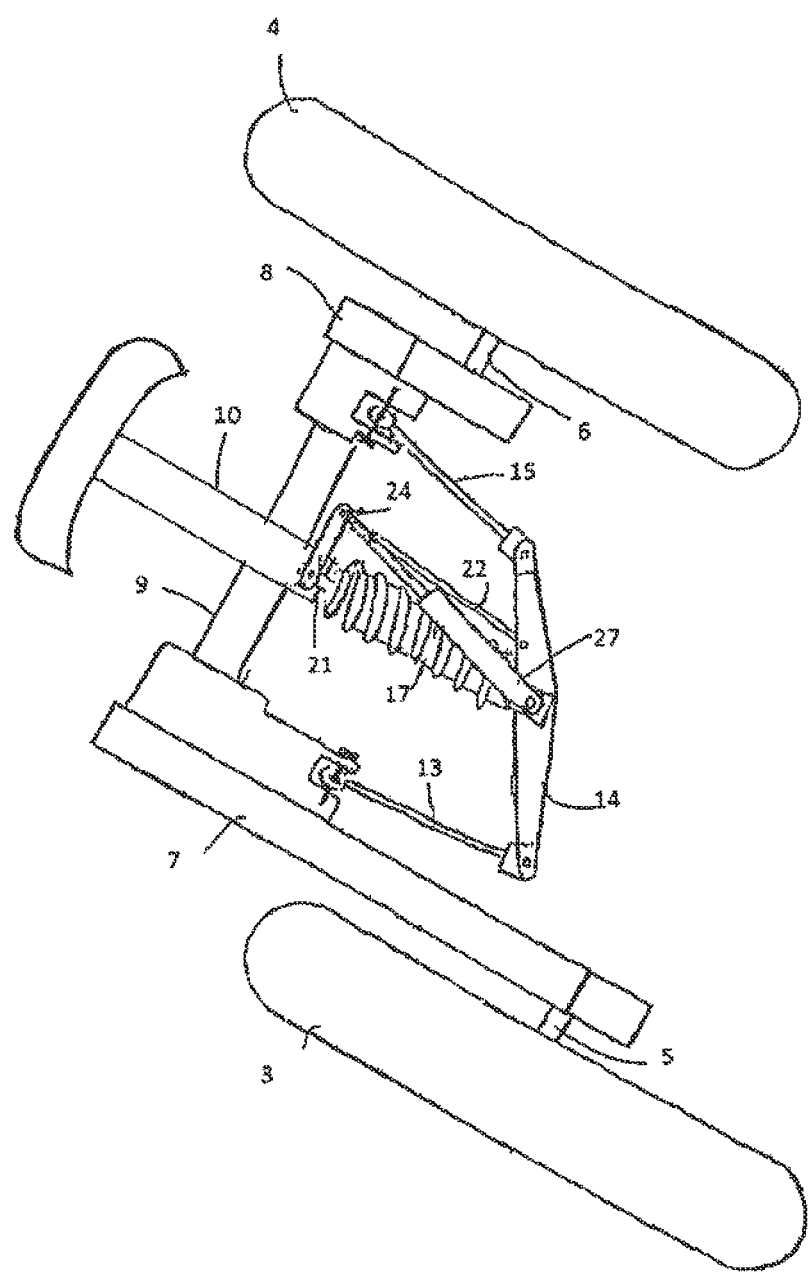
FIG. 2 is a diagrammatic rear view of the same wheel set, with the frame tilted to the right.

In FIG. 2, the same wheel set is tilted to the right. It can be seen that the actuator 27 has been lengthened by a moderate amount, which is favorable for decoupling.

Figure 3:
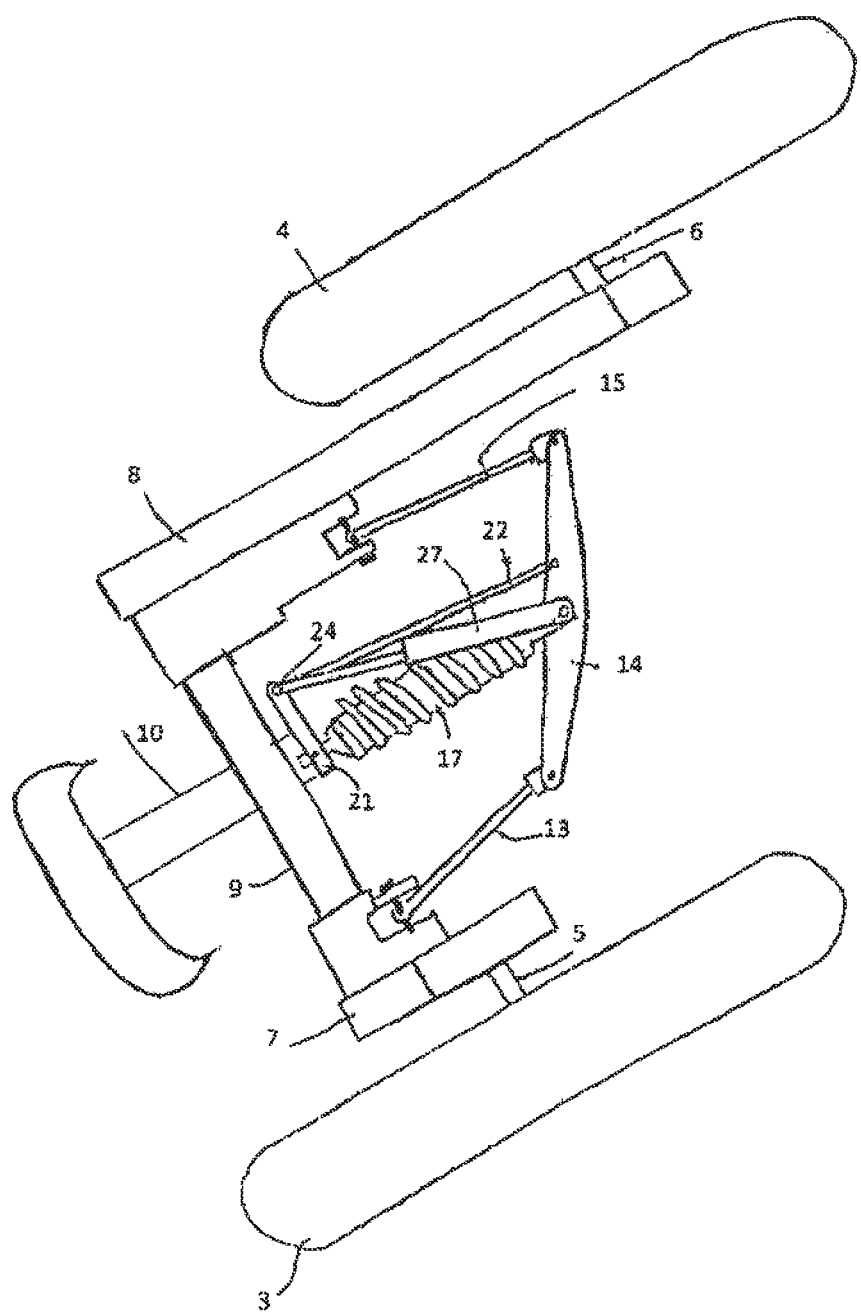
FIG. 3 is a diagrammatic rear view of the same wheel set, with the frame tilted to the left.

In FIG. 3, the same wheel set is tilted to the left. Here the actuator 27 is shortened, likewise by a moderate value.

Figure 4:
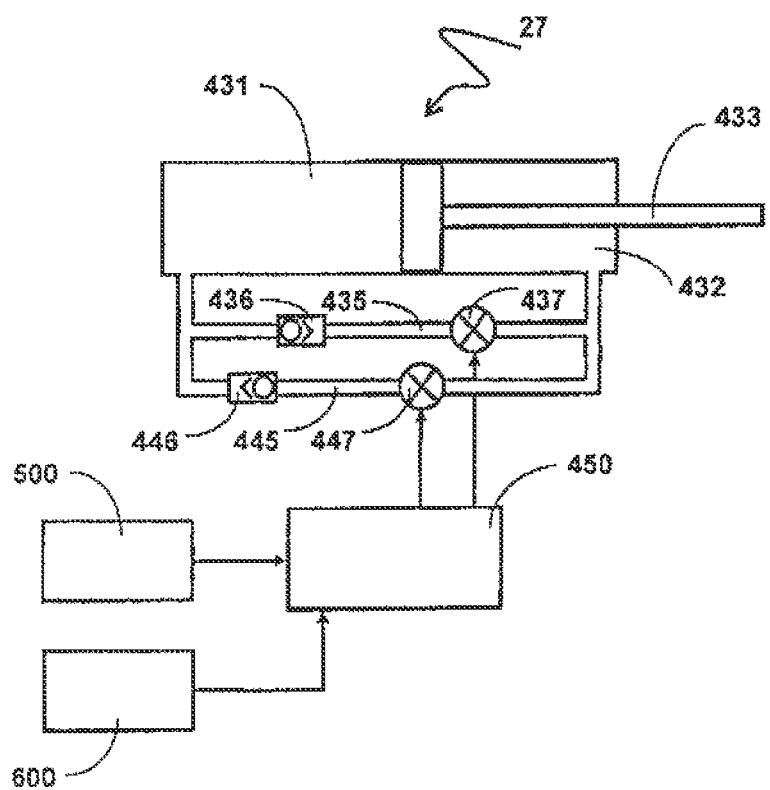
FIG. 4 is a diagram of blocking means.

With reference to FIG. 4, a preferred embodiment of the blocking member 27 is shown. It is a double-acting actuator having a first chamber 431 arranged beside the rocker beam 14 and a second chamber 432 with a rod 433 beside the frame 10.

A first pipe 435 enables fluid to run solely from the first chamber 431 to the second chamber 432. Likewise, a second pipe 445 allows fluid to flow solely from the second chamber 432 to the first chamber 431.

The first and second pipes 435 and 445 include respective first and second check valves 436 and 446 to define their respective non-return directions of fluid flow. Furthermore, the first and second pipes 435 and 445 include respective first and second valves 437 and 447.

A control circuit 450 such as a microcontroller controls the valves in response to the output signal from the accelerometer, which thus measures the acceleration transversely to the frame in the direction perpendicular to its plane.

When the frame is in dynamic equilibrium, i.e. when there is no transverse acceleration, the microcontroller 450 causes the valves to be opened.

When the modulus of the transverse acceleration exceeds a predetermined threshold, two situations may arise.

If the acceleration is positive, i.e. if the frame is tilted too much relative to its equilibrium position, then the control circuit 450 closes the second valve 447 and leaves the first valve 437 open, with this happening when turning to the left. Thus, the actuator can no longer lengthen, but it is capable of shortening. Naturally, when turning to the right, the two valves 437 and 447 are controlled the opposite way round.

In contrast, if the frame 10 is tilted insufficiently relative to the equilibrium position, the control circuit 450 closes the first valve 437 and leaves the second 447 open. The actuator can thus lengthen but cannot shorten.

In order to ensure the blocking means operate successfully and in order to avoid braking the frame too suddenly, the two valves 437 and 447 do not operate as on/off valves but rather they present sections that are variable. The control circuit 450 thus opens the sections of these values as a function of the modulus of the transverse acceleration. By way of example, this function may be linear, with the valve being fully closed for acceleration that is greater than or equal to a set value.

It should be observed that it is possible to use a two-axis accelerometer, with both of these axes in a plane perpendicular to the frame 10, one being in the plane of the frame and the other perpendicular to the frame.

The angle of the acceleration vector in the rectangular frame of reference defined by the two axes of the sensor is thus a direct reflection of the angular offset from the dynamic equilibrium position. This angular offset may serve as a reference for the control circuit 450, instead of the modulus of the transverse acceleration, given that these means are equivalent.

A speed sensor 600 may also provide the longitudinal speed of the device to the control circuit 450. This serves to inhibit the blocking means when the speed is zero or very low, i.e. it leaves the two valves 437, 447 fully open. This avoids opposing erratic movements of the frame, in particular when the vehicle is starting.

It is also possible to provide for locking an angle of tilt of the frame, e.g. for use in rough ground. For this purpose, information is sent to the control circuit 450 so as to cause it to close both valves 437 and 447 completely.

It is also preferable to provide a filter member within the control circuit 450 in order to avoid untimely control of the valves 437, 447 as a result of erratic transverse acceleration appearing. This minimizes the effect of vibration or roughnesses of the roadway. This member, e.g. a lowpass filter, is arranged at the output from the accelerometer 500. Transient conditions that occur in particular at low speed or when entering or leaving a curve are also filtered; operation is stabilized by avoiding oscillations in the servo-control.

The advantage of the above-described blocking means is that they present very little energy consumption since the only active elements are the valves 437 and 447.

Still in the field of hydraulics, it is possible to envisage using a magneto-rheological actuator. The fluid flowing in such an actuator is filled with ferromagnetic particles such that its viscosity is a function of the magnetic field to which it is subjected. It is thus possible to vary its resistance to fluid flow by using an electromagnet.

Nevertheless, the invention applies to any other embodiment of the blocking means providing its function is to control the angle of tilt of a frame 10.

Independently of the blocking means, it may be appropriate to limit the tilt angle of the frame 10 by means of mechanical stops (not shown) so that it remains within a range that extends typically from −30° to +30°.

The embodiments of the invention described above are selected because of their concrete nature. Nevertheless, it is not possible to list exhaustively all possible embodiments covered by the invention. In particular, any of the means described may be replaced by equivalent means without going beyond the ambit of the present invention.

The invention claimed is:

1. A device mounted on a wheel set that comprises:
a rocker beam (14) connected firstly to a tiltable frame (10) by means of a shock absorber (17) and secondly to two oscillating arms (7, 8) via two connecting rods (13, 15); and
blocking means (27) having a first anchor point on said rocker beam (14);
the device being characterized in that it includes decoupling means constituted by a horizontal lever (21) and a vertical lever (22) that are connected together by a connection point (24) about which they are capable of pivoting, the free ends of said levers being connected respectively to said frame and to said rocker beam, a second anchor point of said blocking means (27) being on said decoupling means.

2. A device according to claim 1, characterized in that the second anchor point coincides with said connection point (24).

3. A device according to claim 1, characterized in that said shock absorber (17) has its first end connected to said frame (10) and its second end connected to said rocker beam (14), and said horizontal lever (21) is connected to said frame at said first end.

4. A device according to claim 3, characterized in that said first anchor point is positioned at said second end of said shock absorber (17).

5. A device according to claim 1, characterized in that said blocking means (27) comprise a double-acting actuator.

6. A device according to claim 5, characterized in that the two chambers (431, 432) of said double-acting actuator (27) are connected together by two opposite-direction one-way pipes (435, 445) each including a respective valve (437, 447).

7. A device according to claim 6, characterized in that each of said one-way pipes (435, 445) includes a check valve (436, 446).

8. A device according to claim 5, characterized in that it is arranged, when said transverse acceleration exceeds a predetermined threshold, to close that one of said valves (437, 447) that allows said actuator (27) to move in the direction of said acceleration.

9. A device according to claim 8, characterized in that it is arranged to determine the through section of said valve (437, 447) as a function of the modulus of said transverse acceleration.

10. A device according to claim 9, characterized in that when the longitudinal speed (600) of the device is also available, the device is arranged to determine the flow section of said valve (437, 447) as a function of the modulus of said longitudinal speed.

11. A vehicle fitted with a device according to claim 1.

12. A vehicle according to claim 11, characterized in that it is a quadricycle.

* * * * *